United States Patent
Noyle et al.

(10) Patent No.: US 7,982,741 B2
(45) Date of Patent: Jul. 19, 2011

(54) SHARED GRAPHICS INFRASTRUCTURE

(75) Inventors: Jeffrey M. J. Noyle, Kirkland, WA (US);
Craig C. Peeper, Kirkland, WA (US);
Sam Glassenberg, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 863 days.

(21) Appl. No.: 11/564,484

(22) Filed: Nov. 29, 2006

(65) Prior Publication Data
US 2008/0122852 A1  May 29, 2008

(51) Int. Cl.
G06F 15/16 (2006.01)
G06F 13/14 (2006.01)
G06T 1/20 (2006.01)

(52) U.S. Cl. .................. 345/502; 345/506; 345/520

(58) Field of Classification Search .................. None
See application file for complete search history.

(56) References Cited

U.S. PATENT DOCUMENTS

| | | | |
|---|---|---|---|
| 5,990,904 A | 11/1999 | Griffin | |
| 6,097,397 A | 8/2000 | Lee | |
| 6,326,964 B1 | 12/2001 | Snyder et al. | |
| 6,707,458 B1 | 3/2004 | Leather et al. | |
| 6,717,577 B1 | 4/2004 | Cheng et al. | |
| 7,071,945 B2 | 7/2006 | Parikh et al. | |
| 7,075,545 B2 | 7/2006 | Van Hook et al. | |
| 2004/0217956 A1 | 11/2004 | Besl et al. | |
| 2006/0080677 A1* | 4/2006 | Louie | 719/323 |
| 2007/0035560 A1* | 2/2007 | Lee et al. | 345/629 |

OTHER PUBLICATIONS

E. Eide, A. Reid, J. Regerhr, J. Lepreau; Static and Dynamic Structure in Design Patterns; Proceedings of the 24th International Conference on Software Engineering (ICSE 2002), pp. 208-218; May 2002.*
B.A. Myers; A Complete and Efficient Implementation of Covered Windows; IEEE; Sep. 1986.*
P Bhaniramka, PCD Robert, S Eilemann;OpenGL multipipe SDK: A toolkit for scalable parallel rendering; IEEE Visualization, 2005. VIS 05, Oct. 2005.*
Microsoft; How to Configure and Use Multiple Monitors in Windows XP; http://support.microsoft.com/kb/307873; dated Jul. 15, 2004.*
MSDN, What Is a Swap Chain? (Direct3D 9) (Windows), http://msdn.microsoft.com/en-us/library/bb206356(d=printer,v=vs.85). aspx; retrieved Apr. 30, 2011.*
Lindsath, D., et al.; Implementation of a 2D Game Engine Using DirectX 8.1; 2004; 76 pages.
Bajaj, C., et al.; Making 3D Textures Practical; 10 pages.
Blythe, D.; The Direct3D® 10 System; 2006; 11 pages.

* cited by examiner

*Primary Examiner* — Kee M Tung
*Assistant Examiner* — Carlos Perromat
(74) *Attorney, Agent, or Firm* — Shook, Hardy & Bacon L.L.P.

(57) ABSTRACT

Systems and methods that provide for a common device enumeration point to a class of software objects, which represent hardware and can emit 2D bitmaps, via a presentation interface component. Such presentation interface component can further include a factory component that centralizes enumeration and creation for any components that control or communicate with the frame buffer of the graphics display subsystems. Accordingly, a smooth transition can be supplied between full screen and window models, within desktop composition systems, wherein applications can readily support such transitions.

18 Claims, 10 Drawing Sheets

SHARED GRAPHICS INFRASTRUCTURE

BACKGROUND

Computer systems are commonly employed for displaying graphical objects on a display screen. One purpose of three dimensional (3-D) computer graphics is to create a two-dimensional (2-D) image on a computer screen, and realistically represent an object or objects in three dimensions. Such images created with 3-D computer graphics are used in a wide range of applications For example, different video games and television events or programs employ theses images, and are specifically marketed to specific life styles, target age groups, and the like. Similarly, head mounted computer displays enable users to experience a graphical environment, wherein a user can enjoy an illusion of presence in the displayed environment. In general, such software for generating virtual reality environments have typically been employed for training and entertaining of personnel, wherein relatively inexpensive computing devices enable 3D virtual reality user interfaces. These 3D virtual reality worlds allow a user to explore a simulated environment. Such environments can further include views from an ordinary street scene with walkways, roads, and buildings to a completely fictitious landscape of an outer space planet. In general, the end goal with virtual reality interfaces still remains to provide the user the most realistic experience possible.

Rendering and displaying 3-D graphics typically involves a plurality of calculations and computations. For example, to render a 3-D object, a set of coordinate points or vertices that define an object to be rendered is initially formed, wherein vertices are subsequently joined to form polygons and define surfaces. Once such defining vertices are formed, a transformation from an object or model frame of reference to a world frame of reference and subsequently to 2-D coordinate is completed. Throughout such procedure, vertices can be rotated, scaled, eliminated or clipped (if they fall outside of a viewable area) lit by various lighting schemes and sources, colorized, and the like. Such processes for rendering and displaying a 3-D object can be computationally intensive and can involve a large number of operations for each vertex.

For example, complexities can arise within the shading process that describes appearance of a material at any point of a 1-D, 2-D or 3-D space, via a function (e.g., procedural shader) in a shading parameter space. In general, the object is "immersed" in the original 1-D, 2-D or 3-D space and the values of shading parameters at a given point of surface are defined as a result of procedural shading function at such point. For instance, procedural shaders that approximate appearance of wood, marble or other natural materials have been developed. Moreover, by passing source code designed to work with a shader into an application, a shader becomes an object that the application can create/utilize in order to facilitate the efficient drawing of complex video graphics.

Moreover, often video cards have integrated video capture functionality, wherein captured video frames are placed in video memory (VRAM). In such units, standard mechanism for processing the frames while remaining in VRAM can become challenging—e.g., complexities associated with: copying data into system memory, processing thereof, and subsequently copying back to VRAM for display. Also requirements such as: increased stability when splitting drivers, virtualized memory allocation, security and the ability to multitask with the graphics processor (GPU), can further increase the challenges involved. For example, game users can experience situations where alt tabbing out of a game can force a lost device state in the application. When focus returns to the game, it may become necessary to re-create all resources and reset the device which in the best case took time and in the worst case caused crashing bugs. Users now desire switching focus between application with little penalty, during driver upgrades, physical removal of the device, GPU reset and unexpected errors, for example.

Furthermore, in Windows XP, display drivers, which are large and complex, can be a major source of system instability. Such drivers typically execute entirely in kernel mode (e.g., deep in the system code) and hence a single problem in the driver will often force the entire system to reboot. Additionally, a typical requirement to include code for the support of various device driver interfaces—introduced over many years—can further complicate optimal functionality.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

The subject invention provides for a Graphics infrastructure, which shares an enumeration functionality across multiple producers that produce content to a same monitor(s), via a presentation interface component that is common among such producers (e.g., providing a common device enumeration point to a class of software objects that represent hardware, and can emit 2D bitmaps that are ready for presentation—such as 3D rendering engines, video engines, decoding video and the like). The presentation interface component can further include a factory component that centralizes enumeration and creation for any of the components that control or communicate with frame buffer(s) of graphics display subsystems. Such factory component can further enumerate physical hardware devices (e.g., adapters) on outputs; wherein associated application can determine control of the monitor (e.g., full screen, windowed, and the like). The presentation interface component can include interfaces for presentation; output enumeration; and memory surface representation. Moreover, the presentation interface component can include a common surface that enables sharing of data between various components of the system.

Accordingly and within desktop composition systems, a smooth transition can be supplied between full screen and window models—wherein applications can readily support such transitions. Hence, a user can control fullscreen, and a selection of fullscreen versus windowed is in general no longer performed by the application, and instead placed within control of a user, (e.g. a fullscreen application that loses topmost Z position, is no longer minimized and instead converted to windowed mode and positioned in an appropriate location in the Z order.) Moreover, ubiquity of resource identity can be enabled, wherein resource can be named via a namespace that is available to typically any component within an associated architecture. Lifetime for resources can also be established.

The following description and the annexed drawings set forth in detail certain illustrative aspects of the claimed subject matter. These aspects are indicative, however, of but a few of the various ways in which the principles of such matter may be employed and the claimed subject matter is intended to include all such aspects and their equivalents. Other advantages and novel features will become apparent from the following detailed description when considered in conjunction with the drawings.

DETAILED DESCRIPTION

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
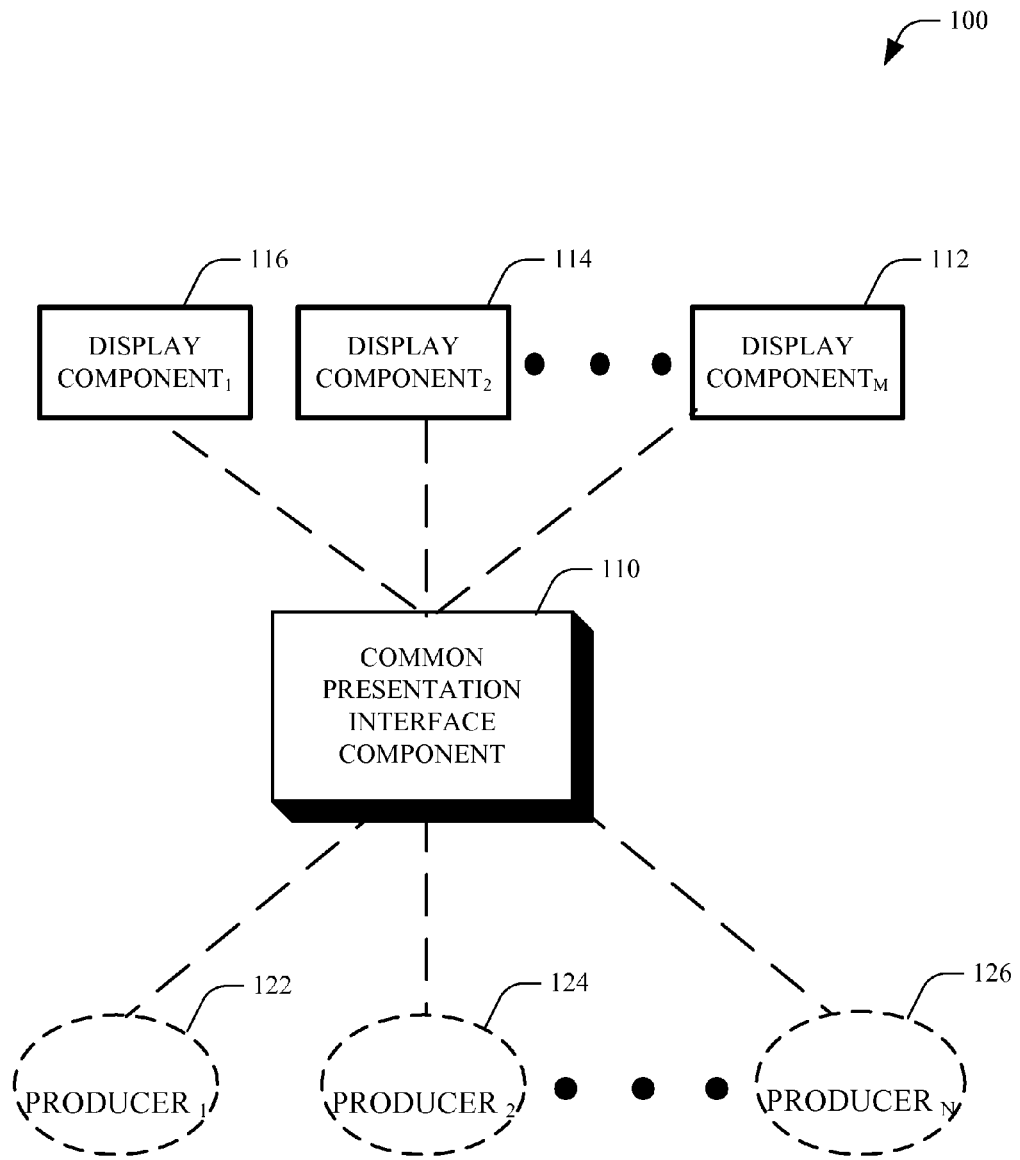
FIG. 1 illustrates a graphics infrastructure that provides a common device enumeration point to a class of software objects, in accordance with an exemplary aspect of the subject innovation.

FIG. 1 illustrates a graphics infrastructure 100 that provides a common device enumeration point to a class of software objects and systems, which can generate images represented by two or three-dimensional arrays of pixels resident in some class of memory, in accordance with an exemplary aspect of the subject innovation. The system 100 includes a common presentation interface 110 that is common among a plurality of producers 122, 124, 126 (1 thru N, N being an integer), which produce content to a same display component (e.g. monitor) 112, 144, 116 (1 thru M, where M is an integer). Such producers 122, 124, and 126 can include a class of software objects that represent hardware and can emit 2D bitmaps ready for presentation; such as 3D rendering engines, video engines, decoding video and the like—which can control or communicate with a frame buffer (not shown) of the graphics display subsystems (associated with display components 112, 114, 116.) In general, the system 100 enables related software components to be authored once and continue to work well within the system over substantially a long period of time, such as for the entire lifetime of the system 100. Moreover, ubiquity of resource identity can be enabled, wherein resource can be named via a namespace that is available to typically any component within an associated architecture.

Figure 2:
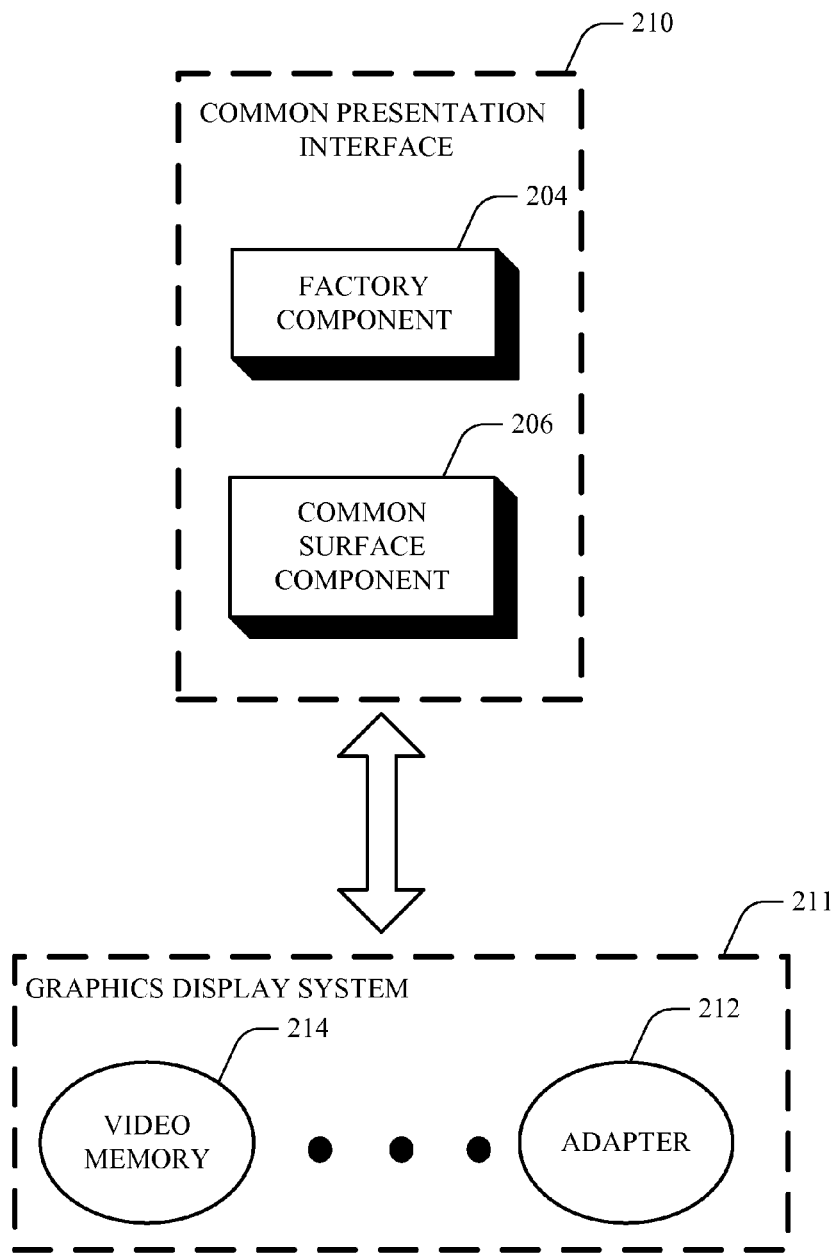
FIG. 2 illustrates a particular common presentation interface component that further includes a factory component and common surface component, in accordance with an aspect of the subject innovation.

FIG. 2 illustrates a particular common presentation interface component in accordance with an aspect of the subject innovation, which includes a factory component 204 and common surface component 206. In general, the factory component 204 centralizes enumeration and creation for any component that controls or communicates with the frame buffer of the graphics display system 211. A factory component 204 object can further administer enumeration of the adapter 212, producer objects and for management of various activities that tie the Graphics Infrastructure of the subject innovation to the broader Operating System (OS.)

For example, this can include enumeration for outputs such as typically any physical connection to a graphics card that allows a monitor or other display device to be attached. Likewise, the factory component 204 can centralize enumeration for an adapter 212, video memory 214 of a graphics card, and the like. Moreover, the common surface component 206 enables sharing of data between various components of the system, to act as a common unit of interchange between objects, and in general any domain-specific producer implementations capable of existing within an inheritance hierarchy associated with the Graphics Infrastructure.

Figure 3:
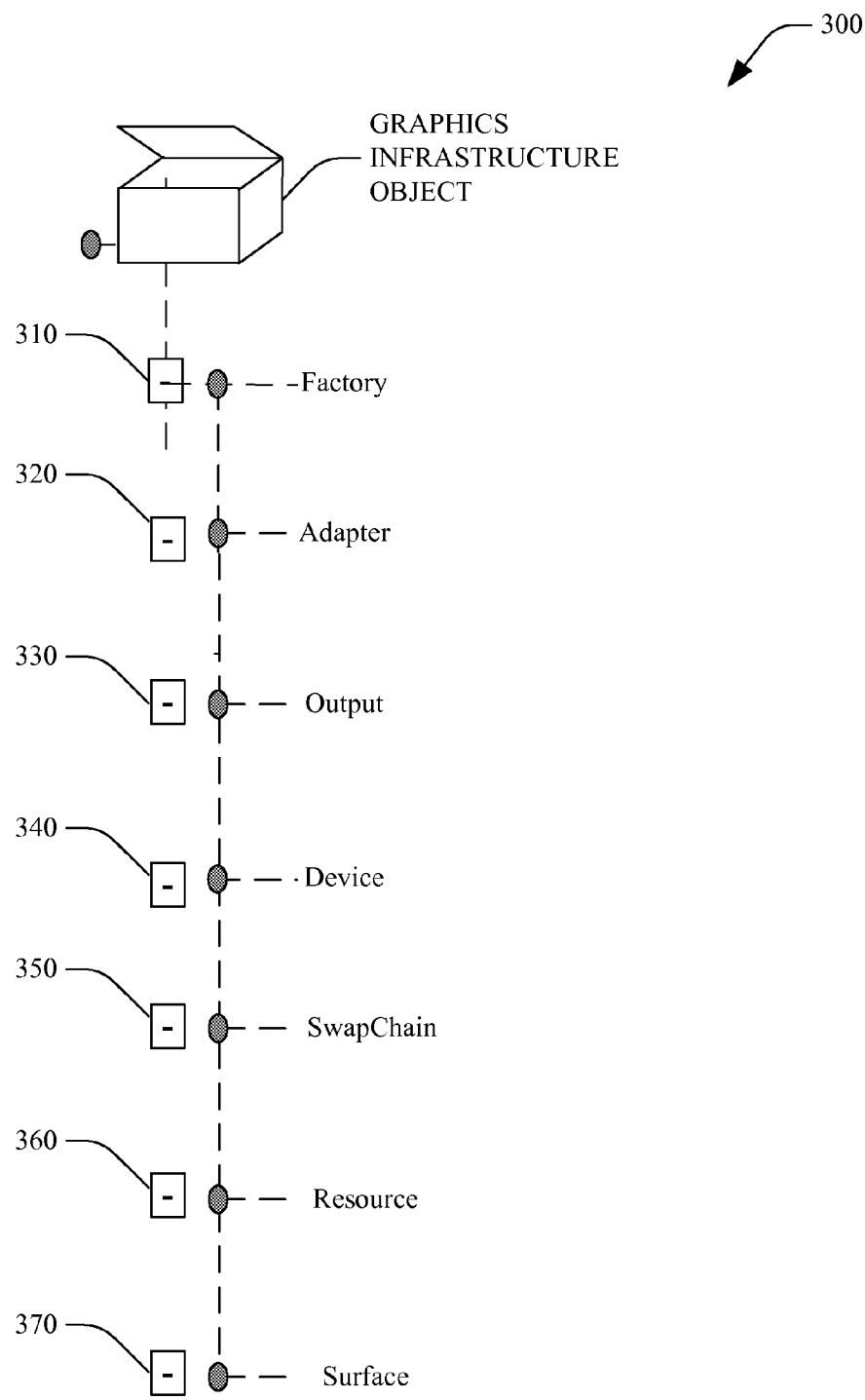
FIG. 3 illustrates an exemplary structure for various objects and interfaces associated with a Graphics Infrastructure of the subject innovation.

FIG. 3 illustrates an exemplary structure 300 for various objects and interfaces associated with a Graphics Infrastructure of the subject innovation. As explained earlier, the factory object 310 is responsible for enumerating adapter object 320 and producer object (not shown), as well as for various house-keeping activities that tie the Graphics Infrastructure to the broader OS. Such adapter object 320 can represent a physical frame buffer, and can further be responsible for enumerating outputs that read from an associated frame buffer and also for related producers writing thereto. In general, such a device has no API-visible interface, and can exist within the factory, wherein each instance of an adapter can be denoted by an ordinal number in the factory API. Moreover, the output 330 can represent any hardware entity that read images from an adapter and display them on an output, such as a Digital-to-analog converter (DAC) that drives a monitor. Likewise, device 340 can consist of a producer, which is a component that draws images into a resource (e.g., a 3D rasterizer-hardware or software; an image capture device; a video decompressor and the like.) Also, the SwapChain 350 can act as the component that encapsulates presentation methodologies and interactions with windowing system for the OS. The resource 360 can function as an abstract interface at the root of all image-data objects (like surfaces, volumes, and the like.) The surface 370 can function as the common unit of interchange between the other objects, and between any domain-specific producer implementations. As such, a producer is enabled to instantiate a driver object.

For the Graphics Infrastructure 300, the lowest level interface can define a common method for associating user-defined data with any object associated with the Graphics Infrastructure; retrieving the producer that created it, and also querying for any container object. For example;

```
interface IDXGIObject : IUnknown
{
    HRESULT SetPrivateData(REFGUID rName, void * pData, UINT cbSizeOfDataInBytes);
    HRESULT SetPrivateDataInterface(REFGUID rName, IUnknown * pInterface);
    HRESULT GetPrivateData(REGFUID rName, void * pBuffer, UINT vsSizeOfBufferInBytes);
    HRESULT GetParent(REFIID rInterface, void ** ppContainer);
};
```

The SetPrivateDataInterface can make calls into the passed-in interface, wherein the implementation of SetPrivateDataInterface calls AddRef on the interface. When the object is destroyed, the list of interfaces associated with the object is walked, and Release is called on each one. In general, such allows an in-proc entity to receive notification of the destruction of any related object, and to perform cleanup of any data associated therewith, for example. Likewise, the Resource interface can include a next level interface available for any object that consumes video memory. Such interface can be a wrapper around the concept of a shared resource handle that is already present in associated library. The handle namespace is thus cross-process. Moreover the interface, along with its parent Object can provide a required lifetime management to enable clean resource sharing amongst associated producers. For example,

```
#define DXGI_RESOURCE_PRIORITY_DISCARD    0x28000000
#define DXGI_RESOURCE_PRIORITY_LOW        0x50000000
#define DXGI_RESOURCE_PRIORITY_NORMAL     0x78000000
#define DXGI_RESOURCE_PRIORITY_HIGH       0xa0000000
#define DXGI_RESOURCE_PRIORITY_MAXIMUM    0xc8000000
interface IDXGIResource : IDXGIDeviceSubObject
{
    HRESULT GetSharedHandle(UINT_PTR *);
    HRESULT GetUsage(DXGI USAGE * pType);
    HRESULT SetEvictionPriority([in] UINT EvictionPriority);
    HRESULT GetEvictionPriority([out,retval] UINT* pEvictionPriority);
};
```

It is to be appreciated that any producer that consumes a Resource can also discover that it has been passed a foreign implementation. If so, such producer can call GetSharedHandle and create its own internal representation of the object. A pointer to that representation can be cached with the object via SetPrivateDataInterface.

Likewise, an object related to the Factory component (which handles enumeration of adapters, creation of swapchains and window focus management chores) can be instantiated by a call to CreateDXGIFactory, wherein for example:

```
interface IDXGIFactory : IDXGIObject
{
    HRESULT EnumAdapters([in] UINT32 iAdapter, [in , out] IDXGIAdapter ** ppAdapterInterface);
    HRESULT MakeWindowAssociation(HWND hWnd, UINT32 Flags);
    //pass NULL to break the association
    HRESULT GetWindowAssociation(HWND * phWnd);
    HRESULT CreateSwapChain(IUnknown * pDevice, DXGI SWAP CHAIN DESC* pDesc, IDXGISwapChain ** ppSwapChain);
    HRESULT CreateSoftwareAdapter([in] HMODULE Module,
    [out] } </pre>
```

Similarly, an adapter component can represent a frame buffer that can be driven by many producers (3D accelerators, video capture cards, and the like), and can drive some number of outputs (monitors via DACs). It is to be appreciated that the adapter does not necessarily need an interface, and associated methods can be attached to the Factory component interface, and augmented with an ordinal integer denoting the adapter. For example:

```
/* Length must be same as MAX_DDDEVICEID_STRING */   ;internal
#define DXGI_MAX_DEVICE_IDENTIFIER_STRING     512
struct DXGI_ADAPTER_IDENTIFIER
{
    char AdapterDescription[DXGI_MAX_DEVICE_IDENTIFIER_STRING];
    LARGE_INTEGER  UserModeDriverVersion;
    DWORD          VendorId;
    DWORD          DeviceId;
    DWORD          SubSysId;
    DWORD          Revision;
    LARGE_INTEGER  DedicatedVideoMemory;
    LARGE_INTEGER  SharedVideoMemory;
};
interface IDXGIAdapter : IDXGIObject
{
    HRESULT EnumOutputs(int iOutput, IDXGIOutput ** ppOutputInterface);
    HRESULT CheckInterfaceSupport(REFGUID InterfaceName, LARGE INTEGER * pUMDVersion);
    HRESULT GetAdapterIdentifier(DXGI ADAPTER IDENTIFIER * pIdentifier);
    HRESULT RegisterDriver([in] HMODULE hModule);
}
```

Figure 4:
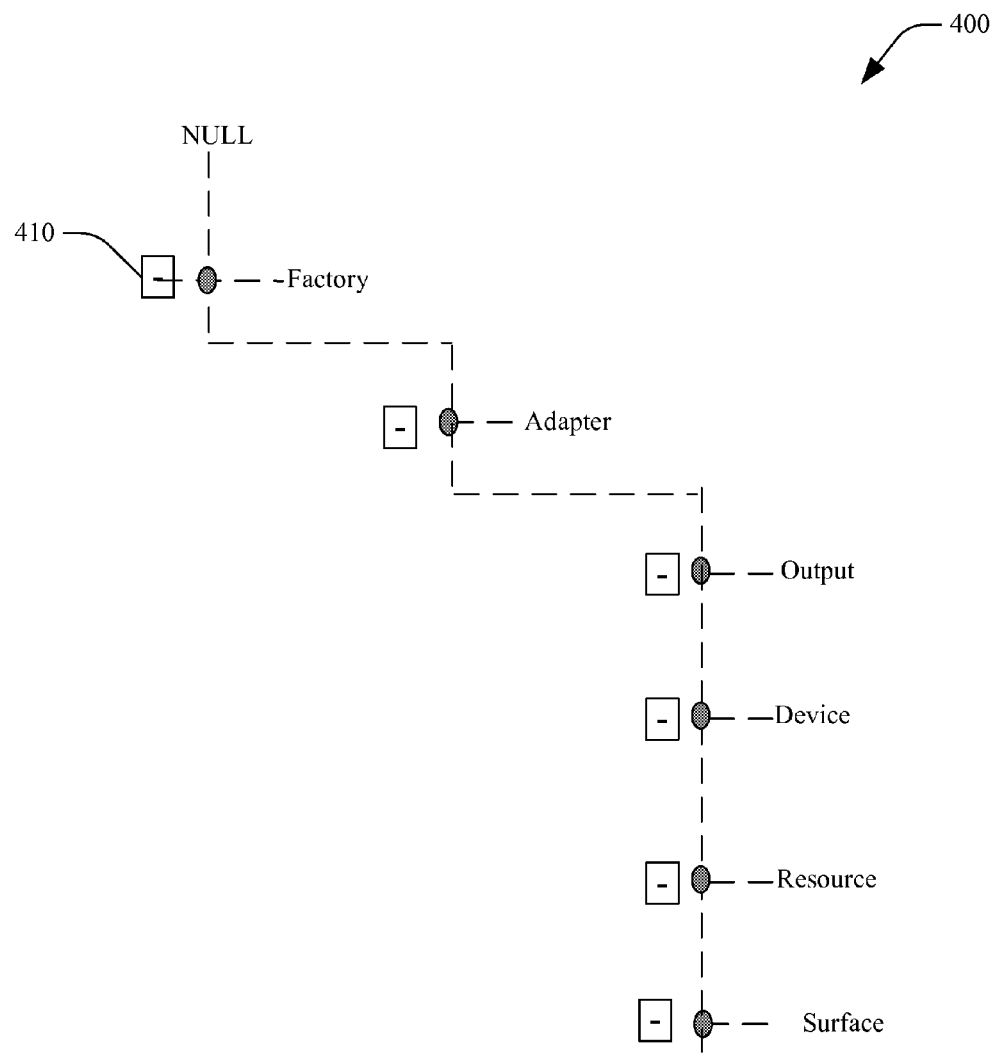
FIG. 4 illustrates a parent-child relation ship for objects associated with a Graphics Infrastructure of the subject innovation.

FIG. 4 illustrates a parent-child relation ship 400 for objects associated with a Graphics Infrastructure of the subject innovation, wherein a parent is the object through whose interface a child object can be created. Such parent-child relationship can exist among interfaces of the Graphic Infrastructure, wherein a "GetParent" instruction on any of such interfaces can retrieve an interface to the object higher in the diagram. It is to be appreciated that "GetParent" and "GetDevice" can return different objects (as is the case for swapchain back buffers).

Moreover, the Graphics Infrastructure of the subject innovation can automatically protect itself from multi-threaded applications, wherein in general the application only has to be aware of multi-threading issues when the interface methods, themselves, do not automatically encapsulate an entire operation. For example, one thread's (Set, Set, Draw) sequence requires the entire (Set, Set, Draw) sequence to be wrapped in a critical section, to protect it from another thread's (Set, Set, Draw) sequence. In general, each producer instance that supports a Device owns a unique critical section. Such allows two threads to each manipulate a unique instance of a producer simultaneously, without significant contention.

Figure 5:
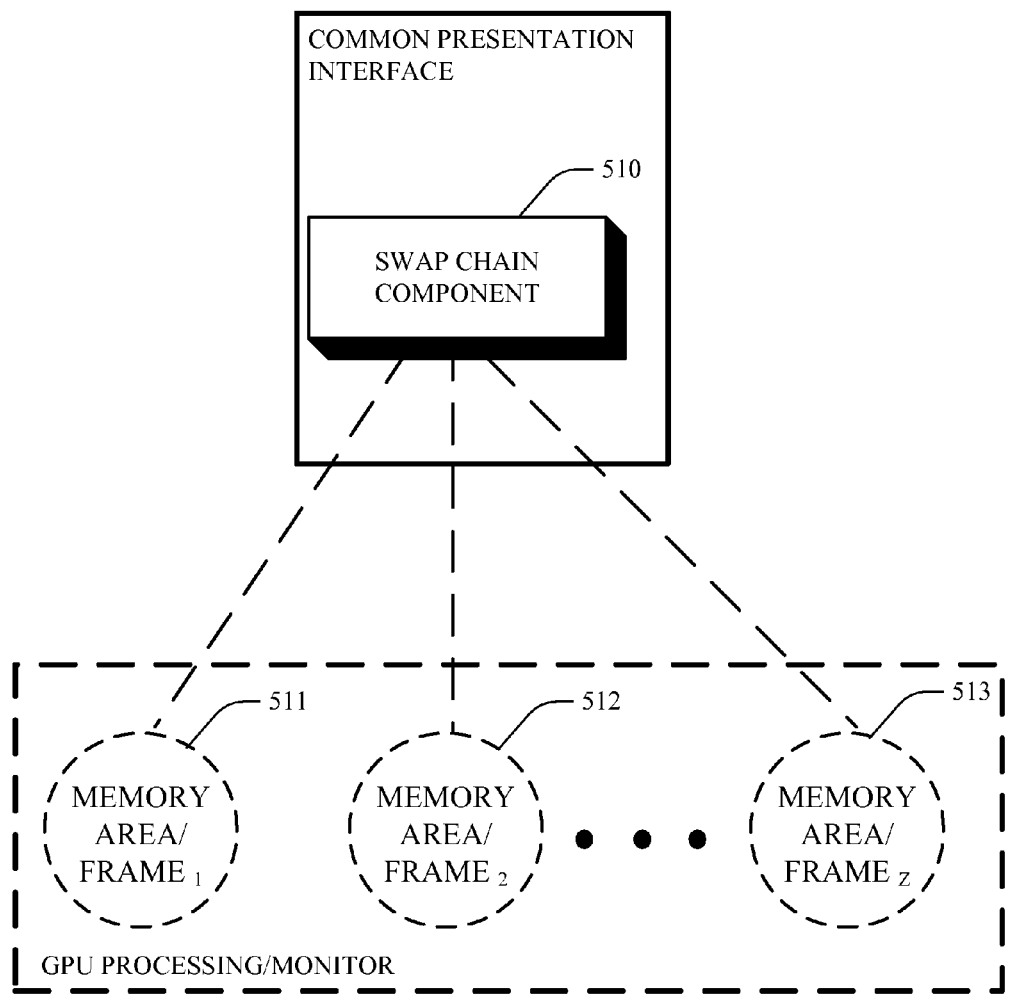
FIG. 5 illustrates a particular common presentation interface component with a swapchain component in accordance with an aspect of the subject innovation.

FIG. 5 illustrates a particular common presentation interface component that includes a swapchain component 510, in accordance with an aspect of the subject innovation. Such swapchain component 510 can enable a progression thru frames 511, 512, 513 (1 thru z, z being an integer)—wherein an area of memory can be employed where rendering thereto occurs, while another image is being displayed and upon rendering the image a swap can occur therebetween. For example, a swapchain can be implemented for a full screen graphics application (e.g., a game), which enumerates adapters to create a device and locate the output (e.g., monitor) that is to be employed. In general, a swap chain is a collection of one or more back buffers that can be serially presented to the front buffer. Accordingly, a smooth transition can be supplied between full screen and window models, within desktop composition systems, wherein applications can readily support such transitions. Hence, a user can control fullscreen, and a selection of fullscreen versus windowed is in general no longer performed by the application, and instead placed within control of a user, (e.g., a fullscreen application that loses topmost Z position, is no longer minimized and instead converted to windowed mode and positioned in an appropriate location in the Z order.)

The swapchain component 510 can offer forward imaging the display subsystem for presentation to the user. For example, swapchain can be created via the Factory component and can further be associated with a producer (through an interface, for example). In a related aspect, the swapchain component 510 can require the following interface to be published by a Device associated with the Graphics Infrastructure:

```
typedef HRESULT (APIENTRY *PFNRESOLVECONTEXT)([in]
HANDLE hRTDevice, [out] void ** ppDXGIContext);
interface IDXGIPresentInternal : IUnknown
{
    HRESULT Present([in] IDXGISurface * pSource, [in] void *
pDXGIContext);
    HRESULT GetContextResolver( [out] void ** ppResolver);
}
```

Figure 6:
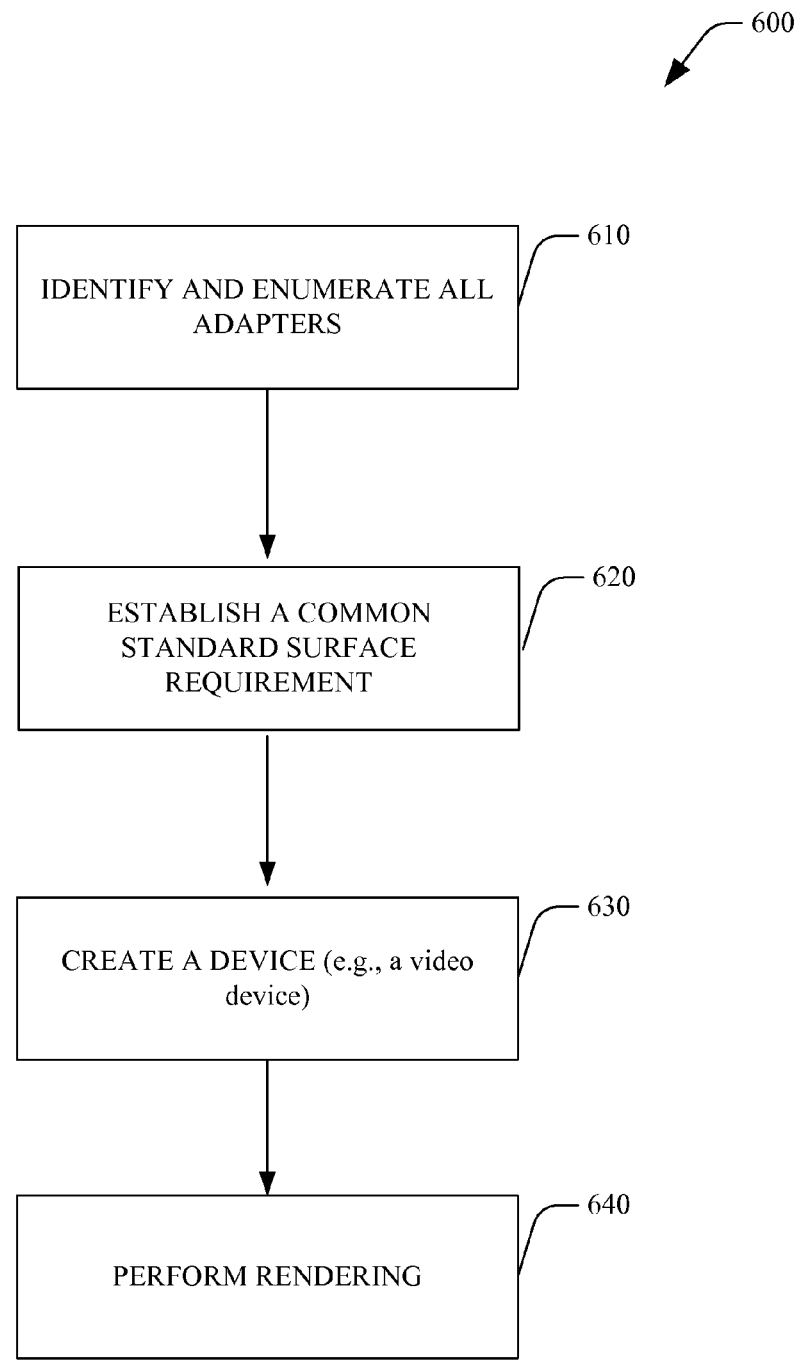
FIG. 6 illustrates a methodology of rendering performance in accordance with an aspect of the subject innovation.

FIG. 6 illustrates a methodology 600 of rendering performance in accordance with an aspect of the subject innovation. While the exemplary method is illustrated and described herein as a series of blocks representative of various events and/or acts, the subject innovation is not limited by the illustrated ordering of such blocks. For instance, some acts or events may occur in different orders and/or concurrently with other acts or events, apart from the ordering illustrated herein, in accordance with the innovation. In addition, not all illustrated blocks, events or acts, may be required to implement a methodology in accordance with the subject innovation.

Moreover, it will be appreciated that the exemplary method and other methods according to the innovation may be implemented in association with the method illustrated and described herein, as well as in association with other systems and apparatus not illustrated or described. Initially, and at 610 a common presentation interface component can identify and enumerate physical hardware devices (such as adapters) on outputs. Next, and at 620 a common standard surface requirement can be established, wherein associated application can determine control of the monitor (e.g., full screen, windowed, and the like). Subsequently, and at 630 a device can be created to perform rendering of objects 640 (e.g., on a flat display.)

Figure 7:
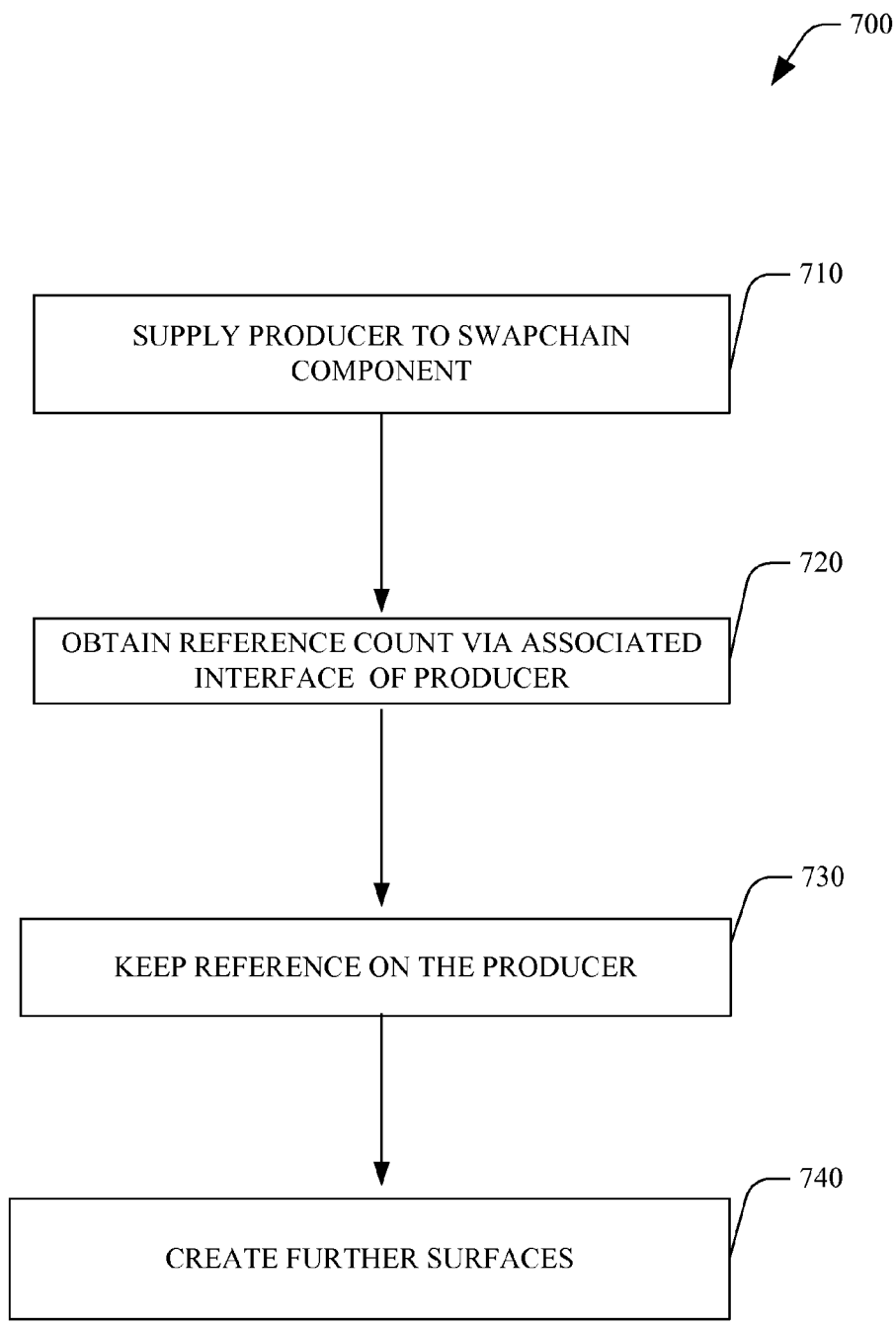
FIG. 7 illustrates a related methodology of supplying reference counts in accordance with an aspect of the subject innovation.

FIG. 7 illustrates a related methodology 700 of supplying reference counts, in accordance with an aspect of the subject innovation. Initially and at 710 a producer is supplied to the swapchain component, when the producer is created. Subsequently, and at 720 such swapchain component causes the producer to obtain a reference count on the swap chain via the producer's associated Interface. Next and at 730, the swap chain component keeps a reference on the producer, and can employ such reference to create further surfaces as required at 740. The swap chain component can also obtain a reference count on the related factory component that created it. In general, such swap chain component requires reference to discover the focus window (e.g., a highlighted window, or window being used by the user for a current context, and the like) that has been chosen by the application. In addition, the swap chain component can query the associated Device interface for a handle representing the instance of the underlying Device Driver Interface (DDI) object.

The swap chain component can facilitate integrating with the OS (window Z order, DCE, beam chasing/glitch-free, multi-cast for TV-out, and the like) inside a single implementation that is commonly available to IDXGIDevice-derived producers. The swap chain component can communicate with the DDI to effect CreateSurface, Blt and Flip, setDAC and other raster-control operations. The swap chain component can further be associated with a IDXGIDevice device at creation time, and can employ such interface to discover a DDI handle from which it queries an interface for this purpose.

```
// Remarks: Fractional value used to represent vertical and
horizontal frequencies of a video mode
//          (i.e. VSync and HSync). Vertical frequencies are stored
in Hz. Horizontal frequencies
//          are stored in KHz.
//          The dynamic range of this encoding format, given 10^-7
resolution is {0..(2^32 – 1) / 10^7},
//          which translates to {0..428.4967296} [Hz] for vertical
frequencies and {0..428.4967296} [KHz]
//          for horizontal frequencies. This sub-microseconds
precision range should be acceptable even
//          for a pro-video application (error in one microsecond for
video signal synchronization would
//          imply a time drift with a cycle of 10^7/(60*60*24) =
115.741 days.
//
//          If rational number with a finite fractional sequence, use
denominator of form 10^(length of fractional sequence).
//          If rational number without a finite fractional sequence,
or a sequence exceeding the precision allowed by the
//          dynamic range of the denominator, or an irrational
number, use an appropriate ratio of integers which best
//          represents the value.
//
typedef struct DXGI_RATIONAL
{
    UINT  Numerator;
    UINT  Denominator;
};
```

```
struct DXGI_MODE_DESC
{
        UINT            Width;
        UINT            Height;
        DXGI_RATIONAL   RefreshRate;
        DXGI_FORMAT     Format;
};
struct DXGI_COLOR_VALUE
{
        float red;
        float green;
        float blue;
};
interface IDXGISwapChain : IDXGIDeviceSubObject
{
        HRESULT Present(
            [in] UINT32 SyncInterval,
            [in] DWORD dwFlags);
        HRESULT GetBuffer([in] UINT iBuffer, [in] REFIID Interface,
[in, out] void ** ppSurface);
        HRESULT SetFullscreenState([in] BOOL bFullscreen, [in]
IDXGIOutput * pTarget); //NULL for windowed, or "don't care where".
Note must call CommmitModeSet to effect changes
        HRESULT GetFullscreenState([out] BOOL * pbFullscreen, [out]
IDXGIOutput ** ppTarget);
        HRESULTGetSwapChainDesc( [out] DXGI SWAP CHAIN DESC *pDesc);
        HRESULT ResizeBuffers( [in] UINT32 Width, [in] UINT32 Height,
[in] DXGI_FORMAT Format, [in] UINT SwapchainFlags);
        HRESULT ResizeTarget( [in] const DXGI MODE DESC *
pNewTargetParameters );
        HRESULT GetContainingOutput(IDXGIOutput ** ppOutput);
        HRESULT GetFrameStatistics([out] DXGI FRAME STATISTICS *
pStats);
        HRESULT GetLastPresentCount([out] UINT * pLastPresentCount);
};
```

Typically, an IDXGIOutput object can be a representation of the global state of the physical object (e.g., a DAC connected to a monitor). If one IDXGIOutput calls for the monitor to change modes, all IDXGIOutputs representing the same physical device will report that mode.

```
struct DXGI_OUTPUT_DESC
{
    char          DeviceName[32];
    RECT          DesktopCoordinates;
    BOOL          AttachedToDesktop;
    DXGI_MODE_ROTATION Rotation;
    //todo: rationalize with MMDMM output handle namespace
};
typedef enum DXGI_MODE_ROTATION
{
    DXGI_MODE_ROTATION_UNSPECIFIED,
    DXGI_MODE_ROTATION_IDENTITY,
    DXGI_MODE_ROTATION_ROTATE90,
    DXGI_MODE_ROTATION_ROTATE180,
    DXGI_MODE_ROTATION_ROTATE270
} DXGI_MODE_ROTATION;
interface IDXGIOutput : IDXGIObject
{
        HRESULT GetOutputDesc(DXGI OUTPUT DESC * pDesc);
        HRESULT GetGammaControlCapabilities(
DXGI_GAMMA_CONTROL_CAPABILIITES * pGammaCaps );
        HRESULT GetDisplayModeList(DXGI_FORMAT EnumFormat, UINT
dwFlags, UINT * pNumModes, DXGI MODE DESC * pDescs);
        HRESULT FindClosestMatchingMode([in] const DXGI_MODE_DESC *
pModeToMatch, [out] DXGI_MODE_DESC * pClosestMatch);
        HRESULT WaitForVBlank( );
        HRESULT TakeOwnership([in] IUnknown * pDevice, BOOL
bExclusive);
        void ReleaseOwnership( );
        //The following methods can only be called when this output
is owned by a device.
        HRESULT SetDisplaySurface([in] IDXGISurface * pSurface, [in]
DXGI MODE DESC * pMode);
```

-continued

```
        HRESULT GetDisplaySurfaceData([in] IDXGISurface *
pDestination);
        HRESULT GetFrameStatistics([out] DXGI_FRAME_STATISTICS *
pStats);
        HRESULT SetGammaLUTValues(DXGI_COLOR_VALUE * pArray);
}
```

An exemplary API Description can include querying capabilities such as:

```
    typedef struct DXGI_GAMMA_CONTROL_CAPABILIITES
    {
      BOOL    ScaleAndOffsetSupported;
      float   MaxConvertedValue;
      float   MinConvertedValue;
      UINT32  NumGammaControlPoints;      //must be in [0,1025]
      float   ControlPointPositions[1025];
    } DXGI_GAMMA_CONTROL_CAPABILIITES;
    HRESULT IDXGIOutput::GetGammaControlCapabilities(
DXGI_GAMMA_CONTROL_CAPABILIITES * pGammaCaps );
```

The driver will return an arbitrarily sized array of float values (up to 1025) that denotes the sample positions of the conversion functionality. Subsequently, the application can define the same number of gamma conversion control points. It is to be appreciated that such array of control point positions can implicitly define the input range of the gamma conversion hardware. The driver can also claim or deny support for independent per-channel, pre-lookup scale and offset. The MaxConcertedValue and MinConvertedValue members allow the driver to express the range of its gamma-conversion hardware.

Regarding specifying Gamma Control, the low level control can be defined as:

```
    typedef struct DXGI_RGB
    {
        float   Red;
        float   Green;
        float   Blue;
    } DXGI_RGB;
    typedef struct DXGI_GAMMA_CONTROL
    {
        DXGI_RGB           Scale;
        DXGI_RGB           Offset;
        DXGI_RGB           GammaCurve[1025];
    } DXGI_GAMMA_CONTROL;
        HRESULT IDXGIOutput::SetGammaControl([in]
    DXGI_GAMMA_CONTROL *);
```

If a previous call to GetGammaControlCapabilities indicated that scale and offset are supported, then the Scale and Offset fields will be honored, otherwise they will be ignored. The application can fill exactly DXGI_GAMMA_CONTROL_CAPABILIITES.NumGammaControlPoints entries inside DXGI_GAMMA_CONTROL.GammaCurve. The supplied table is assumed to start at the lowest input (e.g., frame buffer) value. If the application supplies fewer than necessary control points, then the upper table entries are undefined. Moreover, if the application supplies more than the necessary number of control points, then the extra entries are ignored. In general, the low-level API fails if any of the GammaCurve, Scale or Offset entries are floating-point specials, whether or not those values will be respected. Typically, such low-level API makes no attempt to arbitrate control of the gamma ramp between multiple clients, and the most recent caller's gamma ramp is always respected.

Figure 8:
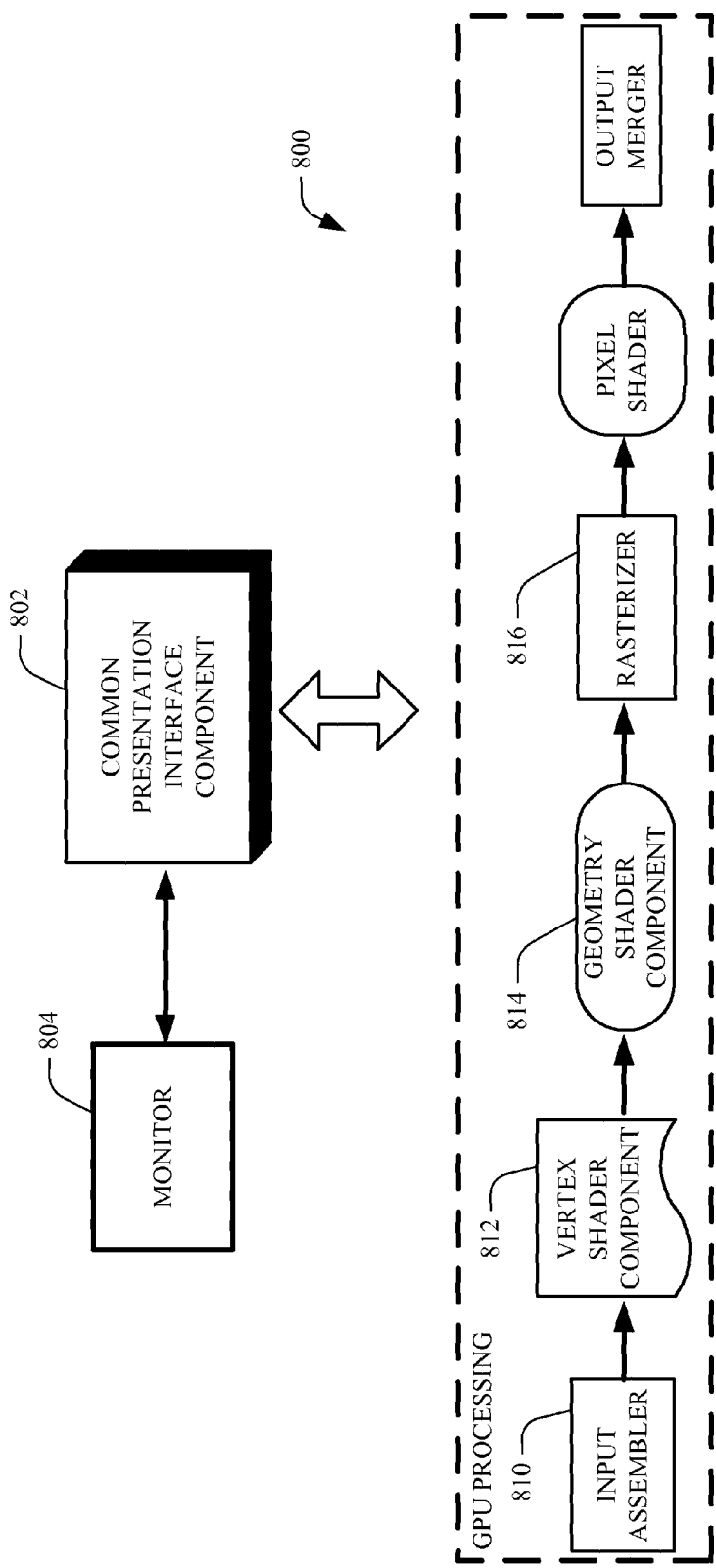
FIG. 8 illustrates a producer device that includes a class of software objects, and interacts with a common presentation interface component in accordance with an aspect of the subject innovation.

FIG. 8 illustrates a producer device 800 that supplies images into a resource (e.g., a 3D rasterizer-hardware), and can include a class of software objects that represent hardware, to emit 2D bitmaps ready for presentation. Such can further include 3D rendering engines, video engines, decoding video and the like, which can control or communicate with a frame buffer associated with the monitor 804. For example, the Input Assembler 810 can gather 1D vertex data from up to 8 input streams attached to vertex buffers and converts such data items to a canonical format (e.g., float 32). Likewise, the vertex shader component 812 can transform vertices from object space to clip space, wherein it reads a single vertex and produces a single vertex as output. Moreover, the geometry shader component 814 operates on a primitive that can represent a plurality of vertices data inputs. For example, such primitive can be a simple geometric element (e.g. a point, line, triangle, adjacencies and the like) that forms the building block of more complex geometric structures. The generated primitives can subsequently be sent to a rasterizer 816 for display of associated graphics. The common presentation interface component 800 can share an enumeration functionality between producer 800 and other producers (not shown) that produce content to the same monitor 804. Hence, a common device enumeration point can be supplied to a class of software objects that represent hardware and can emit 2D bitmaps ready for presentation such as 3D rendering engines, video engines, decoding video and the like).

As used in herein, the terms "component," "system" "object" and the like are intended to refer to a computer-related entity, either hardware, a combination of hardware and software, software or software in execution. For example, a component can be, but is not limited to being, a process running on a processor, a processor, an object, an instance, an executable, a thread of execution, a program and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance or illustration. Any aspect or design described herein as "exemplary" is not necessarily to be construed as preferred or advantageous over other aspects or designs. Similarly, examples are provided herein solely for purposes of clarity and understanding and are not meant to limit the subject innovation or portion thereof in any manner. It is to be appreciated that a myriad of additional or alternate examples could have been presented, but have been omitted for purposes of brevity.

Furthermore, all or portions of the subject innovation can be implemented as a system, method, apparatus, or article of manufacture using standard programming and/or engineering techniques to produce software, firmware, hardware or any combination thereof to control a computer to implement the disclosed innovation. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 9:
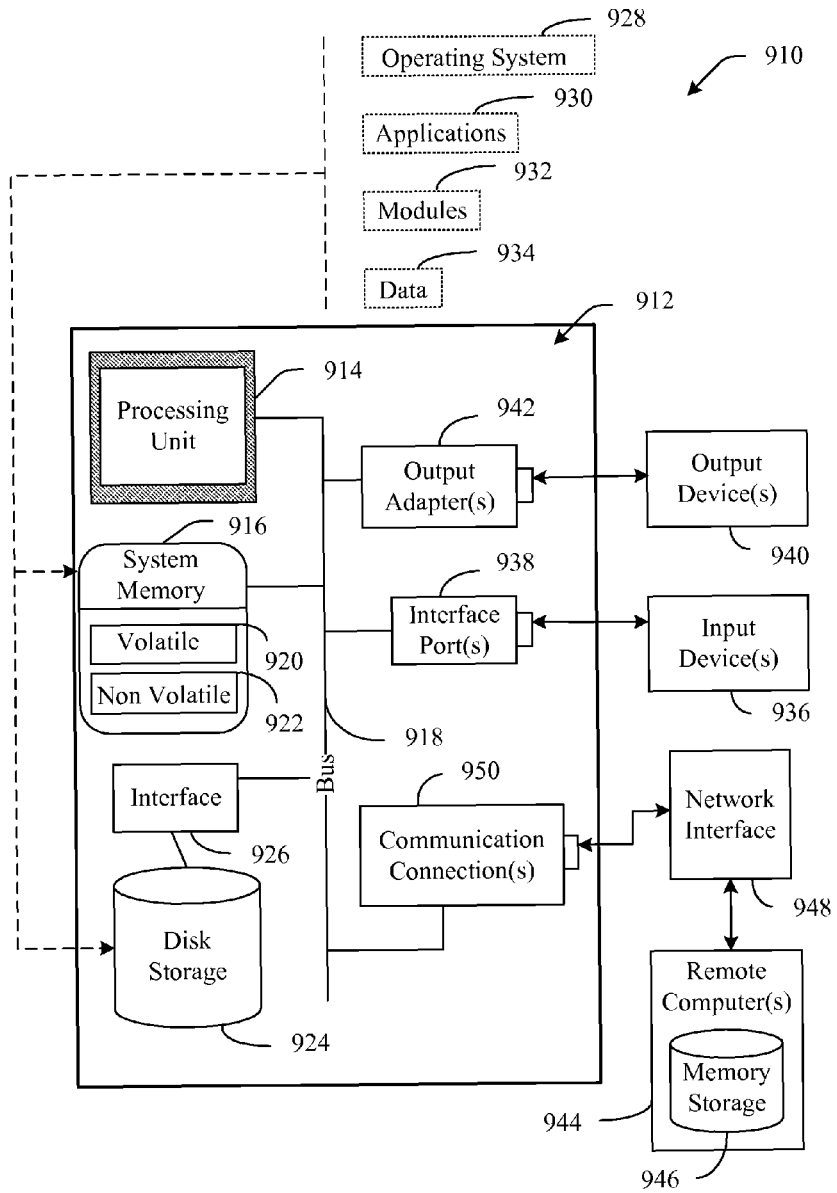
FIG. 9 illustrates an exemplary operating environment for implementing various aspects of the subject innovation.
Figure 10:
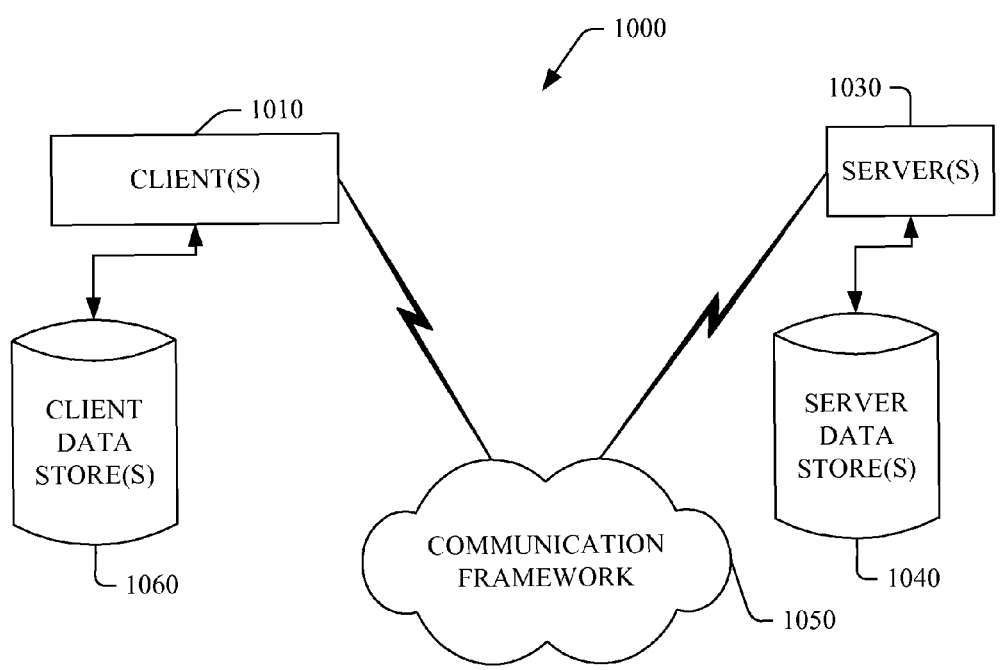
FIG. 10 illustrates a schematic block diagram of a sample computing environment with which the subject innovation can interact.

In order to provide a context for the various aspects of the disclosed subject matter, FIGS. 9 and 10 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the innovation also may be implemented in combination with other program modules. Generally, program modules include routines, programs, components, data structures, etc. that perform particular tasks and/or implement particular abstract data types. Moreover, those skilled in the art will appreciate that the innovative methods can be practiced with other computer system configurations, including single-processor or multiprocessor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the innovation can be practiced on stand-alone computers. In a distributed computing environment, program modules may be located in both local and remote memory storage devices.

With reference to FIG. 9, an exemplary environment 910 for implementing various aspects of the subject innovation is described that includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/non-removable, volatile/non-volatile computer storage media. FIG. 9 illustrates, for example a disk storage 924. Disk storage 924 includes, but is not limited to, devices like a magnetic disk drive, floppy disk drive, tape drive, Jaz drive, Zip drive, LS-60 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that various components described herein can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040 that require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

FIG. 10 is a schematic block diagram of a sample-computing environment 1000 that can be employed for analyzing aggregated tagging behavior of users. The system 1000 includes one or more client(s) 1010. The client(s) 1010 can be hardware and/or software (e.g., threads, processes, computing devices). The system 1000 also includes one or more server(s) 1030. The server(s) 1030 can also be hardware and/or software (e.g. threads, processes, computing devices). The servers 1030 can house threads to perform transformations by employing the components described herein, for example. One possible communication between a client 1010 and a server 1030 may be in the form of a data packet adapted to be transmitted between two or more computer processes. The system 1000 includes a communication framework 1050 that can be employed to facilitate communications between the client(s) 1010 and the server(s) 1030. The client(s) 1010 are operably connected to one or more client data store(s) 1060 that can be employed to store information local to the client(s) 1010. Similarly, the server(s) 1030 are operably connected to one or more server data store(s) 1040 that can be employed to store information local to the servers 1030.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims.

Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. One or more computer storage media not being communication media, the one or more computer storage media having a system embodied thereon, the system comprising the following computer-executable components:
    a common presentation interface component that supplies an enumeration functionality across multiple graphics producers to a plurality of software applications in order to display accelerated graphics content on one or more monitors, wherein each of said monitors is capable of displaying said accelerated graphics content from a plurality of said software applications simultaneously and each of said applications is capable of being displayed on a plurality of said monitors simultaneously such that each of said plurality of monitors displays only a portion of said accelerated graphics content from said application.

2. The media of claim 1, wherein the common presentation interface includes a factory component that centralizes the enumeration and creation of software objects associated with system components.

3. The media of claim 2, wherein the enumeration functionality includes a single, shared device enumeration point for a class of software objects that represent hardware and emit 2D bitmaps.

4. The media of claim 1, wherein the common presentation interface includes a common surface that enables sharing of data between system components.

5. The media of claim 1, wherein a class of software objects that represent hardware and emit 2D bitmaps includes, as a data member, an adapter object that represents a physical device, said physical device including a frame buffer.

6. The media of claim 5, wherein said class of software objects further includes, as a data member, an output object that represents a hardware entity for an image read from the adapter object.

7. The media of claim 5, wherein said class of software objects further includes a method returning, for a given instance of said class, a first interface to an object containing a second interface through which said instance was created.

8. The media of claim 7, wherein said class of software objects further includes a data member corresponding to a swapchain component that progresses through frames.

9. The media of claim 8, wherein said class of software objects further includes, as a data member, a member of an abstract class at the root of a hierarchy of classes for image-data objects.

10. The media of claim 7, wherein a full-screen option is selectable by a user.

11. A computer-implemented method comprising the following computer-executable acts:
    identifying and enumerating physical hardware devices that produce accelerated graphics content and are connected to a monitor; and
    establishing a common standard surface requirement for one or more associated applications to use a plurality of said physical hardware devices to provide accelerated graphics content to a plurality of connected monitors.

12. The computer-implemented method of claim 11, further comprising the act of controlling a mode in which said applications provide accelerated graphics content to the monitors, wherein said mode is selected from the set consisting of:
    full-screen mode; and
    windowed mode.

13. The computer-implemented method of claim 11, further comprising the act of supplying a producer to a swapchain component, said supplying comprising the steps of:
    creating a producer;
    incrementing a reference count associated with said producer via an interface associated with said producer; and
    providing a reference to said producer to said swap chain.

14. The computer-implemented method of claim 13, further comprising the act of using said reference to discover a focus window chosen by an application.

15. The computer-implemented method of claim 13, further comprising the act of using said reference to obtain a handle representing an instance of an underlying Device Driver Interface (DDI) object by querying an associated Device interface of said producer.

16. One or more computer storage media not being computer communication media, the one or more computer storage media having computer-executable instructions embodied thereon that, when executed, perform a method for displaying accelerated graphics content to one or more monitors, the method comprising:

enumerating multiple graphics producers in order to display accelerated graphics content to one or more monitors; and representing a physical frame buffer associated with each of said monitors; and outputting accelerated graphics content generated by said producers on behalf of an application to a plurality of said frame buffers for the corresponding frame.

17. The media of claim 16, wherein the method further comprises displaying a progression of frames.

18. The media of claim 16 wherein the method further comprises providing a user a selection of a full screen view and windowed view of an application.

* * * * *